United States Patent
Keskin et al.

(10) Patent No.: US 9,864,431 B2
(45) Date of Patent: Jan. 9, 2018

(54) CHANGING AN APPLICATION STATE USING NEUROLOGICAL DATA

(71) Applicant: MICROSOFT TECHNOLOGY LICENSING, LLC, Redmond, WA (US)

(72) Inventors: Cem Keskin, Seattle, WA (US); David Kim, Bellevue, WA (US); Bill Chau, Sammamish, WA (US); Jaeyoun Kim, Issaquah, WA (US); Kazuhito Koishida, Redmond, WA (US); Khuram Shahid, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/152,401

(22) Filed: May 11, 2016

(65) Prior Publication Data
US 2017/0329404 A1 Nov. 16, 2017

(51) Int. Cl.
*G06F 3/041* (2006.01)
*G06F 3/01* (2006.01)
*G06T 19/00* (2011.01)

(52) U.S. Cl.
CPC ............. *G06F 3/015* (2013.01); *G06F 3/017* (2013.01); *G06T 19/006* (2013.01)

(58) Field of Classification Search
USPC ................................................ 600/300, 566
See application file for complete search history.

(56) References Cited

U.S. PATENT DOCUMENTS

| | | | |
|---|---|---|---|
| 5,617,855 | A | 4/1997 | Waletzky et al. |
| 5,899,867 | A | 5/1999 | Collura |
| 6,243,096 | B1 | 6/2001 | Takanashi |
| 6,494,830 | B1 | 12/2002 | Wessel |
| 7,554,549 | B2 | 6/2009 | Sagar et al. |
| 7,580,742 | B2 | 8/2009 | Tan et al. |
| 8,020,104 | B2 | 9/2011 | Robarts et al. |
| 8,157,731 | B2 | 4/2012 | Teller et al. |

(Continued)

FOREIGN PATENT DOCUMENTS

| | | |
|---|---|---|
| EP | 2344031 | 10/2014 |
| WO | 2014138925 | 9/2014 |

(Continued)

OTHER PUBLICATIONS

U.S. Appl. No. 15/152,403, filed May 11, 2016, Keskin et al.

(Continued)

*Primary Examiner* — Tony Davis
(74) *Attorney, Agent, or Firm* — Workman Nydegger

(57) ABSTRACT

Computer systems, methods, and storage media for changing the state of an application by detecting neurological user intent data associated with a particular operation of a particular application state, and changing the application state so as to enable execution of the particular operation as intended by the user. The application state is automatically changed to align with the intended operation, as determined by received neurological user intent data, so that the intended operation is performed. Some embodiments relate to a computer system creating or updating a state machine, through a training process, to change the state of an application according to detected neurological data.

16 Claims, 7 Drawing Sheets

(56) References Cited

U.S. PATENT DOCUMENTS

| | | | |
|---|---|---|---|
| 8,203,530 | B2 | 6/2012 | Chiang |
| 8,786,546 | B1 | 7/2014 | Bendickson et al. |
| 8,788,951 | B2 | 7/2014 | Zalewski et al. |
| 9,030,495 | B2 | 5/2015 | McCulloch et al. |
| 9,031,293 | B2 | 5/2015 | Kalinli-Akbacak |
| 2005/0017870 | A1 | 1/2005 | Allison et al. |
| 2006/0224046 | A1 | 10/2006 | Ramadas et al. |
| 2008/0214902 | A1 | 9/2008 | Lee et al. |
| 2008/0255702 | A1 | 10/2008 | Lin |
| 2009/0210208 | A1* | 8/2009 | McIntyre ............ A61N 1/36082 703/11 |
| 2009/0327171 | A1 | 12/2009 | Tan et al. |
| 2010/0016752 | A1* | 1/2010 | Sieracki ................ G10L 13/00 600/544 |
| 2010/0234752 | A1 | 9/2010 | Sullivan et al. |
| 2011/0152710 | A1 | 6/2011 | Kim et al. |
| 2012/0011477 | A1 | 1/2012 | Sivadas |
| 2012/0083668 | A1* | 4/2012 | Pradeep ............. A61B 5/04015 600/300 |
| 2012/0178065 | A1* | 7/2012 | Naghavi ............ G09B 19/0092 434/236 |
| 2012/0212406 | A1 | 8/2012 | Osterhout et al. |
| 2012/0257035 | A1 | 10/2012 | Larsen |
| 2014/0058528 | A1 | 2/2014 | Contreras-Vidal et al. |
| 2014/0169596 | A1 | 6/2014 | Lunner et al. |
| 2014/0191939 | A1 | 7/2014 | Penn et al. |
| 2014/0266982 | A1 | 9/2014 | Nepveu |
| 2014/0342818 | A1 | 11/2014 | Smith et al. |
| 2014/0349256 | A1 | 11/2014 | Connor |
| 2014/0354534 | A1 | 12/2014 | Mullins |
| 2014/0369537 | A1 | 12/2014 | Pontoppidan et al. |
| 2015/0012426 | A1 | 1/2015 | Purves et al. |
| 2015/0045007 | A1 | 2/2015 | Cash |
| 2015/0070270 | A1 | 3/2015 | Bailey et al. |
| 2015/0105111 | A1 | 4/2015 | Rodriguez |
| 2015/0128120 | A1* | 5/2015 | Han .................... G06F 9/44505 717/168 |
| 2015/0220157 | A1* | 8/2015 | Marggraff ............... G06F 3/017 345/156 |
| 2015/0296152 | A1 | 10/2015 | Fanello et al. |

FOREIGN PATENT DOCUMENTS

| | | |
|---|---|---|
| WO | 2014151874 | 9/2014 |
| WO | 2015090430 | 6/2015 |
| WO | 2015102733 | 7/2015 |

OTHER PUBLICATIONS

"Facial Expression Detections", Retrieved on: Dec. 3, 2015 Available at: https://emotiv.zendesk.com/hc/en-us/articles/201216295-Facial-Expression-Detections.

"Kokoon EEG Headphones", Published on: Jun. 13, 2015. Available at: http://drishtimagazine.com/kokoon-eeg-headphones/.

"Moving (Virtual) Mountains—Just With the Power of Thoughts", Published on: Feb. 11, 2015 Available at: https://hololens.wordpress.com/tag/eeg/.

Abhang, et al., "Emotion Recognition using Speech and EEG Signal—A Review", In International Journal of Computer Applications, vol. 15, No. 3, Feb. 2011, pp. 37-40.

Bieliková, Mária, "A Body-Monitoring System with EEG and EOG Sensors", In ERCIM News No. 51, Oct. 2002, 2 pages.

Choi, et al., "Enhanced Perception of User Intention by Combining EEG and Gaze-Tracking for Brain-Computer Interfaces (BCIs)", In Journal of Sensors, vol. 13, Issue 3, Mar. 13, 2013, pp. 3454-3472.

Chun, et al., "Real-Time Face Pose Tracking and Facial Expression Synthesizing for the Animation of 3D Avatar", In Proceedings of Second International Conference on Technologies for E-Learning and Digital Entertainment, Jun. 11, 2007, 2 pages.

Fukahori, et al., "Exploring Subtle Foot Plantar-based Gestures with Sock-placed Pressure Sensors", In Proceedings of the 33rd Annual ACM Conference on Human Factors in Computing Systems, Apr. 18, 2015, 10 pages.

Hondrou, et al., "Affective, Natural Interaction Using EEG: Sensors, Application and Future Directions", In Proceedings of 7th Hellenic Conference on Artificial Intelligence: Theories and Applications, May 28, 2012, pp. 331-338.

Hornero, et al., "Brain Computer Interface (BCI) Systems Applied to Cognitive Training and Home Automation Control to offset the Effects of Ageing", In Publication of Lychnos, No. 8, Mar. 2012, 6 pages.

Hossain, Munshi Asif, "Detection of Fast & Slow Hand and Foot Movement using EEG signals", In Thesis of Jadavpur University, May 2014, 90 pages.

Kiguchi, et al., "Estimation of User's Hand Motion based on EMG and EEG Signals", In Proceedings of World Automation Congress, Aug. 3, 2014, pp. 1-5.

Kilicarslan, et al., "High Accuracy Decoding of User Intentions Using EEG to Control a Lower-Body Exoskeleton",In Proceedings of 35th Annual International Conference of the IEEE Engineering in Medicine and Biology Society, Jul. 3, 2013, pp. 5606-5609.

Lana, et al., "Detection of Movement Intention Using EEG in a Human-Robot Interaction Environment", In Journal of Research on Biomedical Engineering, Nov. 30, 2015, 10 pages.

Li, et al., "Estimation of Eye Closure Degree Using EEG Sensors and Its Application in Driver Drowsiness Detection", In Journal of Sensors, Sep. 18, 2014, pp. 17491-17515.

Liao, et al., "Gaming control using a wearable and wireless EEG-based brain-computer interface device with novel dry foam-based sensors", In Journal of NeuroEngineering and Rehabilitation, Jan. 28, 2012, pp. 1-11.

Liu, et al., "Real-time EEG-based Emotion Recognition and its Applications", In Publication of Transactions on computational science XII, Jan. 1, 2011, 23 pages.

Lv, et al., "Hand-free motion interaction on Google Glass", In Proceedings of Mobile Graphics and Interactive Applications, Dec. 3, 2014, 1 page.

Mohammadi, et al., "EEG based foot movement onset detection with the probabilistic classification vector machine", In Proceedings of the 19th international conference on Neural Information Processing—vol. Part IV, Nov. 12, 2012, 2 pages.

O'Regan, et al., "Automatic detection of EEG artefacts arising from head movements using EEG and gyroscope signals", In Journal of Medical Engineering & Physics, vol. 35, Issue 7, Jul. 2013, 2 pages.

Poulios, et al., "Multi-sensor Interactive Systems for Embodied Learning Games", In Proceeding of the 10th International Conference on Advances in Computer Entertainment—vol. 8253, Nov. 12, 2013, 2 pages.

Rached, et al., "Emotion Recognition Based on Brain-Computer Interface Systems", In Proceedings of Third International Conference on Innovative Computing Technology, Aug. 29, 2013, pp. 253-270.

Vera, et al., "Augmented Mirror: Interactive Augmented Reality System based on Kinect", In Proceedings of the 13th IFIP TC 13 international conference on Human-computer interaction—vol. Part IV, Sep. 5, 2011, pp. 1-5.

Wehbe, et al., "EEG-Based Assessment of Video and In-Game Learning", In Proceedings of Extended Abstracts on Human Factors in Computing Systems, Apr. 27, 2013, 6 pages.

Tsui, Chun Sing Louis, et al.: "A Self-Paced Brain-Computer Interface for Controlling a Robot Simulator: An Online Event Labelling Paradigm and an Extended Kalman Filter Based Algorithm for Online Training", Feb. 19, 2009, pp. 257-265.

Mahmoidi, Babak, et al.: "A Electro-encephalogram Based Brain-Computer Interface: Improved Performance by Mental Practice and Concentration Skills", Oct. 7, pp. 959-969.

"International Search Report and the Second Written Opinion in PCT Application No. PCT/US2017/030943," dated Aug. 4, 2017.

"International Search Report and the Written Opinion" issued in PCT Application No. PCT/US201703177, dated Jul. 12, 2017.

* cited by examiner

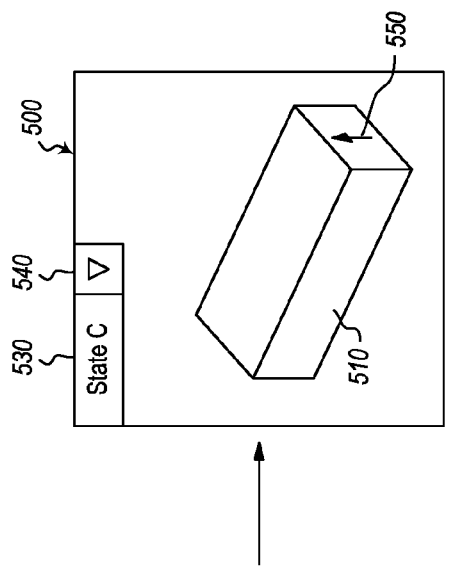
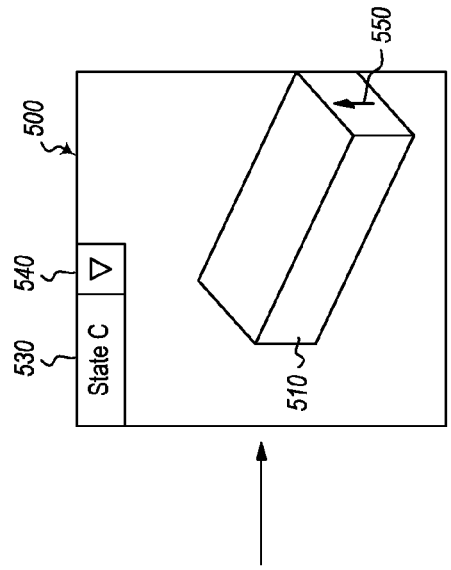
*Figure 5C*
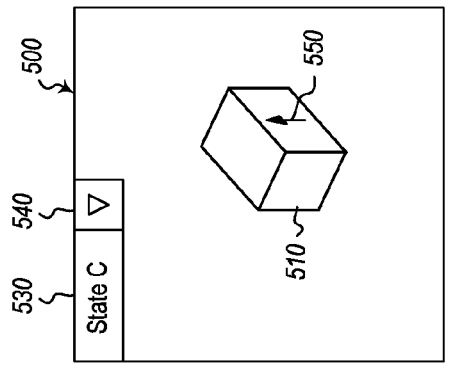
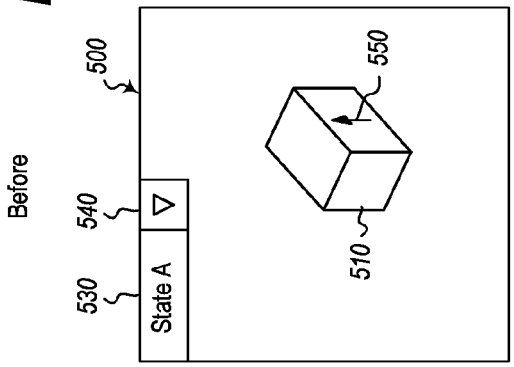
*Figure 5D*
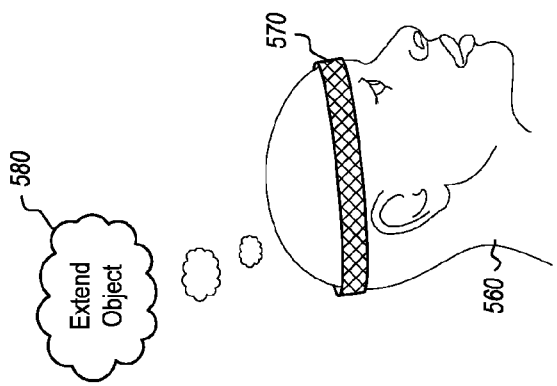

CHANGING AN APPLICATION STATE USING NEUROLOGICAL DATA

BACKGROUND

Neurological data can be gathered through a variety of techniques. One non-invasive technique is electroencephalography (EEG), which involves the placement of electrodes along the scalp of a user or subject to measure voltage fluctuations resulting from ionic current within the neurons of the brain. EEG is often used in clinical contexts to monitor sleep patterns or to diagnose epilepsy.

Some computer applications include various application states, where the same user input is operable to cause different functions within the application depending on the particular application state that the application is in when the user input is received. By way of example, a combination of 'click and drag' input is operable to perform a variety of different functions within some 3D modeling software, depending on the state of the application at the time the input is received (e.g., selecting and moving an object, rotating the object, drawing a line on the object, defining an edge on the application, extruding a surface from the object, and so forth.

When a user desires to perform a particular operation that is not associated with the current application state, the user must manually change from the current application state to another application state by making a specific menu selection or by otherwise providing input that is operable for changing the application to the desired application state.

The subject matter claimed herein is not limited to embodiments that solve any disadvantages or that operate only in environments described above. Rather, this background is only provided to illustrate exemplary technology areas where some embodiments described herein may be practiced.

BRIEF SUMMARY

The present disclosure relates to computer systems, methods, and computer storage media configured for facilitating application state changes. In some embodiments, the state changes are performed with detected neurological user intention data associated with a particular operation of a particular application state, and changing the application state so as to enable execution of the particular operation as intended by the user and without requiring a user to manually change the application state. In some embodiments, the application state is automatically changed to align with the intended operation, as determined by received neurological user intent data.

Some embodiments include a computer system operating an application that is configured to change state and that performs a first operation in response to detecting a particular gesture when in a first state, and a second operation in response to detecting the particular gesture when in a second state. When in the first state, the computer system detects neurological user intention data associated with the second operation. In response, the computing system changes the application from the first state to the second state, enabling execution of the intended second operation and without requiring user input to manually change the application state.

Some embodiments relate to a computer system generating or updating a state machine configured to change the state of an application according to detected neurological data. The computer system associates a set of different application operations to a corresponding set of application states. A particular gesture causes the application to perform a particular operation of the set of operation based on a corresponding application state. The computer system detects first neurological user intention data generated when the user is performing the particular gesture to actuate a first operation, and detects second neurological user intention data generated when the user is performing the particular gesture to actuate a second operation. The computer system subsequently maps or otherwise associates the first and second neurological user intention data with the first and second operations, respectively, within an appropriate stored data structure.

Some embodiments relate to a computer system generating or updating a state machine by detecting first neurological user intention data generated by a user when the user changes the application to a particular state in order to perform a desired particular operation, and detecting second neurological user intention data generated by the user during performance of the gesture that actuates the particular operation. The computer system then maps or otherwise associates the first neurological user intention data with the particular application state and the second neurological user intention data with the particular operation within an appropriate stored data structure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 5A-5D illustrate operation of a state machine to automatically change the state of an exemplary application to enable execution of an intended application operation, as determined using neurological user intent data.

DETAILED DESCRIPTION

Figure 1:
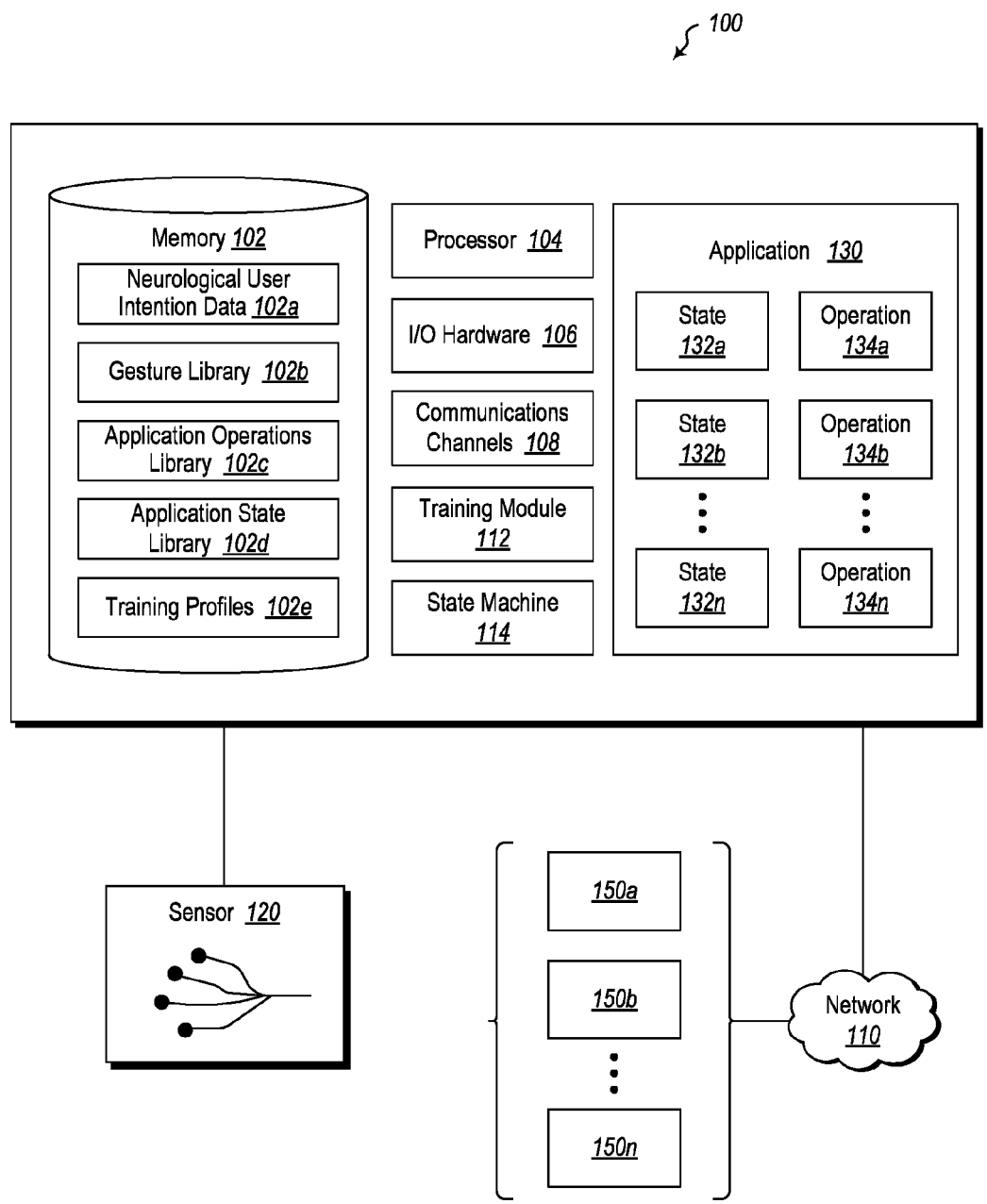
FIG. 1 illustrates a computer system that can be used to change the state of an application using neurological user intent data.

The present disclosure relates to computer systems, methods, and computer storage media for changing a state of an application by detecting neurological user intention data associated with a particular operation of a particular application state, and changing the application state so as to enable execution of the particular operation as intended by the user.

In some embodiments, the neurological user intention data is associated with a particular gesture that causes different application operations among a set of application operations, depending on the current state of the application. In some embodiments, the application state is automatically changed in response to received neurological user intention data, and the particular operation associated with the neurological user intention data is automatically performed, in response to receiving the neurological user intention data.

Various technical effects and benefits may be achieved by implementing aspects of the disclosed embodiments. For instance, some disclosed embodiments are operable to facilitate efficient selection and/or change of application state for computer applications having multiple states. This can be particularly beneficial for applications in which the same or similar gestures will selectively cause the performance of different operations depending on the different application state settings. The use of neurological user intent data can help facilitate user selection of different states and/or functions by at least reducing the number of manual inputs that have to be entered and processed for changing states.

By way of example, at least some of the disclosed embodiments enable efficient use of computer applications having multiple states, particularly where the same or similar gestures cause the performance of different operations according to the particular state setting of the application. For example, where an application includes multiple modes of action for a single gesture depending on the particular state setting of the application, a user of a prior computer system is required to manually switch between state settings to perform different desired operations, often through cumbersome menu navigation steps, even though the operations are actuated through the same user gesture. This prolongs the time taken to perform desired tasks using the application, as the user is required to access a menu option or use some other manual selection process to switch between multiple states to allow the sequence of desired operations to be performed. In contrast, the disclosed embodiments provide systems that are more efficient and provide increase user convenience.

Further, in at least some circumstances, mistakes are made as a user performs a gesture with the intent to cause performance of a specific operation, without realizing that the application is presently in a state that associates a different mode of action to the performed gesture. The user will have thereby inadvertently caused performance of an undesired operation. Such missteps require additional operational steps to undo, mitigate, or otherwise fix the operational error, adding to computer system processing requirements and processing time, in addition to adding to user frustration.

In contrast, one or more of the disclosed embodiments enable automatic change to the intended application state, so that the intended operation is performed, even without requiring the user to manually change the application state. The disclosed embodiments are therefore usable to improve the overall user experience with applications having various different states and which are responsive to one or more gestures according to different modes of operation. The error reduction can reduce user frustration as well as reduce the amount of computer processing involved to achieve a given set of operations. Further, even in circumstances where a user is careful and errors are minimal, the embodiments disclosed herein are usable to reduce the time and overall number of steps required to achieve a desired result by reducing or eliminating the need to manually switch between application states between different desired operations.

As used herein, the term "gesture" includes movements and motions made by one or more body parts of a user. In some embodiments, a gesture need not be actually physically performed by a user to give functional effect. For example, in some circumstances neurological user intention data corresponding to a physical gesture is generated when a user thinks about and/or focuses on a movement in the same way an amputee might think about moving an amputated limb.

In some embodiments, a gesture is performed without the accompaniment of any additional input hardware. Such gestures include, for example, finger pinch movements, finger or hand swipe movements, pointing gestures, head movements (e.g., tilting, turning, or nodding of the head), limb movements (e.g., raising or lowering of an arm or leg, flexion or extension of a joint, rotating of the hand or foot), digit movements (e.g., finger and/or toe movements), facial movements (e.g., smiling, furrowing the brow, intentionally blinking), full body movements (e.g., squatting, twisting the torso, bending at the waist, jumping), combinations of the foregoing, or other movements.

In alternative embodiments, a gesture is performed in conjunction with one or more input hardware components. Such gestures include, for example, keyboard strokes, touch screen or touchpad swipes or taps, mouse controller clicks, click and drag movements, scroll wheel turning movements, button pushing on a game controller, rotating or tilting an accelerometer, and/or other gestures performed using one or more pieces of input hardware.

In some instances, a gesture is limited to a single stand-alone action. In other embodiments, a gesture includes a combination of a plurality of one or more of the gestures described above. In such instances, a combination gesture will often, but not necessarily, correspond to a corresponding set of a plurality of related functions (e.g., a select, move and merge combination). In other embodiments, the combination gesture will only correspond to a single function.

Neurological signals used to generate neurological user input data may be gathered using EEG. Other embodiments utilize neurological data gathered through other means, in addition to or alternative to EEG, such as magnetoencephalography (MEG), functional magnetic resonance imaging (fMRI), or other techniques for gathering context-based neurological data. In presently preferred embodiments, non-invasive EEG techniques are also used. It will be appreciated, however, that the scope of this disclosure also covers embodiments in which the described/claimed EEG sensor is replaced and/or supplemented with the MEG, fMRI and/or other context-based neurological data.

In this description and in the claims, the term "computing system" or "computer architecture" is defined broadly as including any standalone or distributed device(s) and/or system(s) that include at least one physical and tangible processor, and a physical and tangible memory capable of having thereon computer-executable instructions that may be executed by the processor(s).

FIG. 1 illustrates an exemplary computer system 100 configured for changing the state of an application in response to received neurological user intention data. As shown, the illustrated computer system 100 includes memory 102 and at least one processor 104. It will be appreciated that although only a single processor 104 is shown, the system 100 may also include a plurality of processors. The memory 102 may be physical system memory, which may be volatile, non-volatile, or some combination of the two. The term "memory" may also be used herein to refer to non-volatile mass storage such as physical storage media.

The illustrated embodiment includes an EEG sensor 120 through which a user provides neurological input to the computer system 100. The computer system 100 optionally includes other input/output hardware 106, including one or more keyboards, mouse controls, touch screens, microphones, speakers, display screens, track balls, scroll wheels, and the like to enable the receiving of information from a user and for displaying or otherwise communicating information to a user.

The illustrated computer system 100 also includes an application 130 capable of operation on the computer system 100. As shown, the application 130 includes a number of different application states 132a through 132n (referred to generically as states 132), and a number of application operations 134a through 134n (referred to generically as operations 134). One or more of the application operations 134 are associated with a specific application state or set of application states 132, such that the one or more application operations 134 are only operable when the application is in an associated application state.

The application 130 may be 3D modeling software or other modeling software, a video game, a virtual reality or augmented reality simulator, an audiovisual service, a word processor, a spreadsheet application, a web browser, a database manager, an application for controlling mechanical tools and/or other machinery (e.g., for moving and operating robotic arms or other machinery), or any other application having a plurality of different application states and being capable of performing different operations within the different states.

Operations may include object move operations, build operations, edit operations, animation or actuation operations, data input or output operations, display operations, audio operations, character/object movement or control operations, menu operations, navigation operations, processing operations, or other operations performable within the application 130 to modulate input or output, settings, responses (e.g., visual, audio, and/or mechanical responses), and the like. Although a single exemplary application 130 is shown in this embodiment, it will be understood that a plurality of different applications may also be included with and/or added to the computer system 100.

The computer system 100 includes executable modules or executable components 112 and 114. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

The illustrated computer system 100 includes communication channels 108 that enable the computing system 100 to communicate with one or more separate computer systems. For example, the computer system 100 may be a part of network 110, which may be configured as a Local Area Network ("LAN"), a Wide Area Network ("WAN"), or the Internet, for example. In some embodiments, the computer system 100 communicates with and/or is part of a distributed computer environment 150, as indicated by the plurality of separate computer systems 150a through 150n, each of which may contain one or more of the disclosed components that are shown in system 100, entirely or partially, such as one or more of the memory components, application components, or any of the other components.

The various components illustrated in FIG. 1 represent only a few example implementations of an integrated computer system configured for generating a state machine to enable changing of an application state according to received user intention data. Other embodiments may divide the described memory/storage, modules, components, and/or functions differently among additional computer systems. For example, in some embodiments the training module 112 and the state machine 114 are included in different computer systems and/or locations, whereas in other embodiments they are included in the same standalone computer system, as illustrated.

In some embodiments, memory components and/or program modules are distributed across a plurality of constituent computer systems in a distributed environment. In other embodiments, memory components and program modules are included in a single integrated computer system. Accordingly, the systems and methods described herein are not intended to be limited based on the particular location at which the described components are located and/or at which their functions are performed.

According to the illustrated embodiment, the memory 102 is used for storing data and records such as the illustrated neurological user intention data 102a, gesture library 102b, application operations library 102c, application state library 102d, and training profiles 102e. As explained in more detail below, one or more embodiments of the present disclosure are configured to receive neurological user intention data 102a (e.g., as received from sensor 120), and to associate the user intention data 102a with corresponding application operations 102c and the corresponding gestures 102b used to actuate the application operations 102c.

In many instances, a single gesture will be related to a plurality of application operations differentiated according to the application state at the time the gesture is performed. Accordingly, at least some embodiments associate application operations 102c with application states 102d. In some instances, the various associations made by using the embodiments described herein are stored in the training profiles 102e, as shown. In other embodiments, the training profiles 102e and/or other data elements shown in FIG. 1 are stored at one or more locations remote to the computer system 100. For example, the training profiles 102e may be stored at a third party server (e.g., a game server) that accesses and applies the training profiles 102e, when necessary.

In some embodiments, the training profiles 102e are broken down according to individual users, groups of individual users (e.g., a family profile), individual applications, and/or sets of applications in order to, for example, enable formation of a more fine-tuned profile based on individual differences in neurological signal generation.

The illustrated computer system 100 includes a training module 112 configured to generate, update, and/or manage a state machine 114. The state machine 114 is configured to receive neurological user intention data from the sensor 120, and to translate the user intention data into application instructions for changing an application state of an application 130 according to the received neurological user intention data.

The training module 112 is configured to detect neurological user intention data and associate the user intent data to a corresponding application operation. For example, in some implementations the training module 112 operates in conjunction with a training application or training wizard to provide a series of instructions and/or prompts to guide a user through a training process for a particular application or set of applications. In one example, a prompt directs a user to perform a particular application operation while the training module 112 monitors the corresponding neurological data generated by the user. Alternatively, or additionally, the training module 112 runs in the background as the user runs the application 130, functioning to monitor application activity and the corresponding neurological signals generated by the user during normal use of the application 130. During use, when the user performs a gesture to actuate a particular corresponding operation, the neurological signature generated by the user is associated with the particular application operation.

Although a particular gesture may actuate a plurality of different application operations, as described above, the generated neurological user intent data associated with at least some of the different operations includes detectable differences based on the fact that the user intends a different effect when performing the particular gesture, according to the particular application state the user is aware of at the time of the gesture. The generated user intent data corresponding to the particular application operation thereby provides a means for distinguishing between different application operations, even though the different operations rely upon the same underlying gesture for actuation. By associating the neurological user intent data to the application operations, and by associating/mapping the application operations to the application states within which they are operable, the neurological user intent data is usable to align the application state with the user's intent, in order to perform the correct and desired application operation.

In some embodiments, the training module 112 is also configured to parse the application 130 to determine various application operations 134 that rely on a shared underlying gesture, and to associate these various application operations to the different application states 132 within which they are operable. Additionally, or alternatively, the gestures, operations, and/or states relevant to a particular training process or training application may be user-selected according to user needs and preferences.

In some embodiments, the training module 112 is configured to map or otherwise associate received neurological data to corresponding application operations by generating one or more model(s) or other data structure(s) that correlate/map the neurological data to the corresponding intended application operations. In some embodiments, the training module 112 includes signal processing functionality to provide filtering (e.g., low and/or high band-pass filtering and/or filtering of delta and gamma EEG waves), artifact removal (e.g., removal of common EEG artifacts known to be associated with blinks, yawns, extraneous audio or visual stimulation, or other data and movements that are not correlated to the gesture underlying the intended application operation), and/or other processing of one or more signals of the received neurological data 102a.

The mapping may include averaging, the application of best-fit algorithms, or any other statistical or correlation mapping algorithm(s). In some embodiments, the training module 112 is operable to perform regression analysis on the received neurological data. For example, different user intentions for a particular gesture may correlate to different percentages of the power spectrum (e.g., as determined through Fourier analysis) within the different wave bands (alpha, beta, gamma, delta) of the corresponding EEG signals, may correlate to an amount of phase and/or magnitude synchrony, and/or may correlate to other characteristics of the corresponding EEG signals.

In preferred embodiments, the training module 112 is configured to use machine learning techniques to correlate the received EEG signal information to the corresponding intended application operations in order to generate a predictive model that can provide the intended application operation as output based on a neurological signal input.

The illustrated computer system 100 also includes a state machine 114 configured to apply one or more correlations/associations (e.g., as stored in training profiles 102e) to received neurological user intention data to generate application instructions for controlling the state of the application 130, according to the predicted intent of the user. In some circumstances, a training process as described herein is used to create or update a state machine by associating application operations 134 and application states 132 with neurological user intention data 102a. The state machine 114 can subsequently receive a neurological user intention data input from the sensor 120 and can use the input to determine the user intended operation corresponding to the input (e.g., according to one or more regression models and/or machine learning models generated during a training process and applied by the state machine).

In some embodiments, the state machine 114 is operable even in the absence of a prior training process. For example, some applications have sufficient similarity to applications for which an associated state machine has already been created, to enable use of the state machine with an application without the need for a specific training process and/or generation of a new state machine prior to use with the application.

Additionally, or alternatively, creating a state machine includes obtaining neurological data from a plurality of different users and building a database of obtained neurological data from a plurality of users. For example, in some embodiments the computer system 100 enables downloading (e.g., through network 110) of a generic state machine for a particular application from a third party or a state machine service. A generic state machine includes, for example, predictive models generated through measured EEG intent data for a plurality of users while the users perform context-specific operations. In some embodiments, EEG intent data or other neurological user intent data usable for creating and/or updating a state machine includes data from a database already containing stored neurological data (e.g., from a plurality of users).

In some embodiments, a generic state machine provides immediate "plug and play" functionality, allowing the computer system to forego an initial training process prior to use of the state machine with an application. Optionally, the computer system 100 enables a user to modify or fine-tune a generic state machine to generate an individualized or customized state machine tailored to an individual or group of individuals. In addition, some embodiments enable creation of a state machine from scratch, without the use of or modification of a generic state machine.

In preferred embodiments, the state machine 114 is configured to change the state of an application to enable execution of the intended operation with minimal latency. In at least some circumstances, the state machine 114 operates to change the application state substantially in real-time, so that from the perspective of the user, the application performs the state change without any additional latency beyond the latency inherent in processing and applying the state change in the particular application.

In the description that follows, embodiments are described with reference to acts that are performed by one or more computing systems. If such acts are implemented in software, one or more processors of the associated computing system that performs the act direct the operation of the computing system in response to the processor(s) of the computing system having executed computer-executable instructions that are embodied on one or more computer-readable media (e.g., hardware storage device(s)). An example of such an operation involves the manipulation of data.

The computer-executable instructions (and the manipulated data) may be stored in the memory 102 of the computer system 100, and/or in one or more separate computer system components. The computer-executable instructions may be used to implement and/or instantiate all of the functionality disclosed herein, including the functionality that is disclosed in reference to one or more of the flow diagrams of FIGS. 2 through 4.

Figure 2:
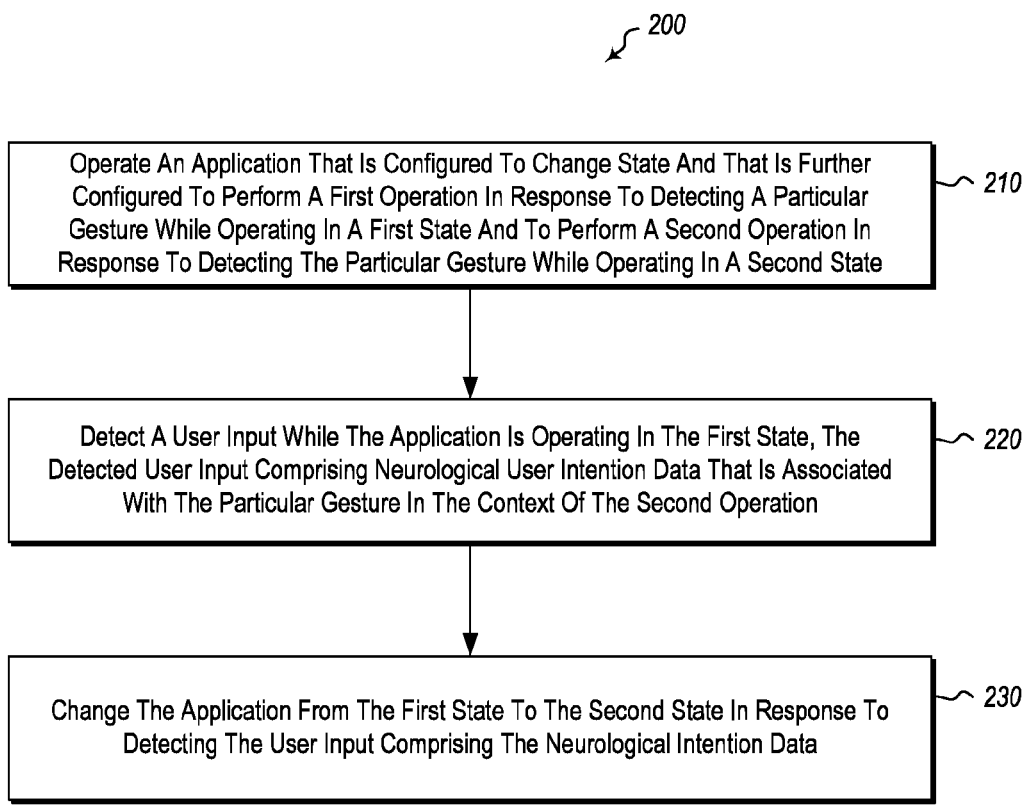
FIG. 2 illustrates a flowchart of an exemplary method for changing the state of an application using neurological user intent data.

FIG. 2 is a flowchart 200 of a computer-implemented method for using neurological user intention data to change the state of an application. As shown, a computer system operates an application that is configured to change state and that is further configured to perform a first operation in response to detecting a particular gesture while operating in a first state and to perform a second operation in response to detecting the particular gesture while operating in a second state (act 210). By way of example, the application may be a word processing application, and the operation may be a paste operation following the copying of a selection of text. In a first state, the application may paste the selection with formatting that matches the destination, whereas in a second state, the application may paste the selection with formatting that matches the source, for example.

The computer system subsequently detects a user input while the application is operating in the first state, the detected user input comprising neurological user intention data that is associated with the particular gesture in the context of the second operation (act 220). Continuing with the word processing application example, the word processing application may be set to paste the selection with destination formatting, while the computer system detects neurological user intention data associated with a paste command gesture (e.g., a Ctrl+v keyboard stroke) as associated with an intent to paste the selection with source formatting.

The computing system then changes the application from the first state to the second state in response to detecting the user input comprising the neurological intention data (act 230). For example, the word processing application is changed from the destination-formatting state to the source-formatting state so as to align with the user's intention in performing the paste operation, as indicated by the received neurological user intention data.

Figure 3:
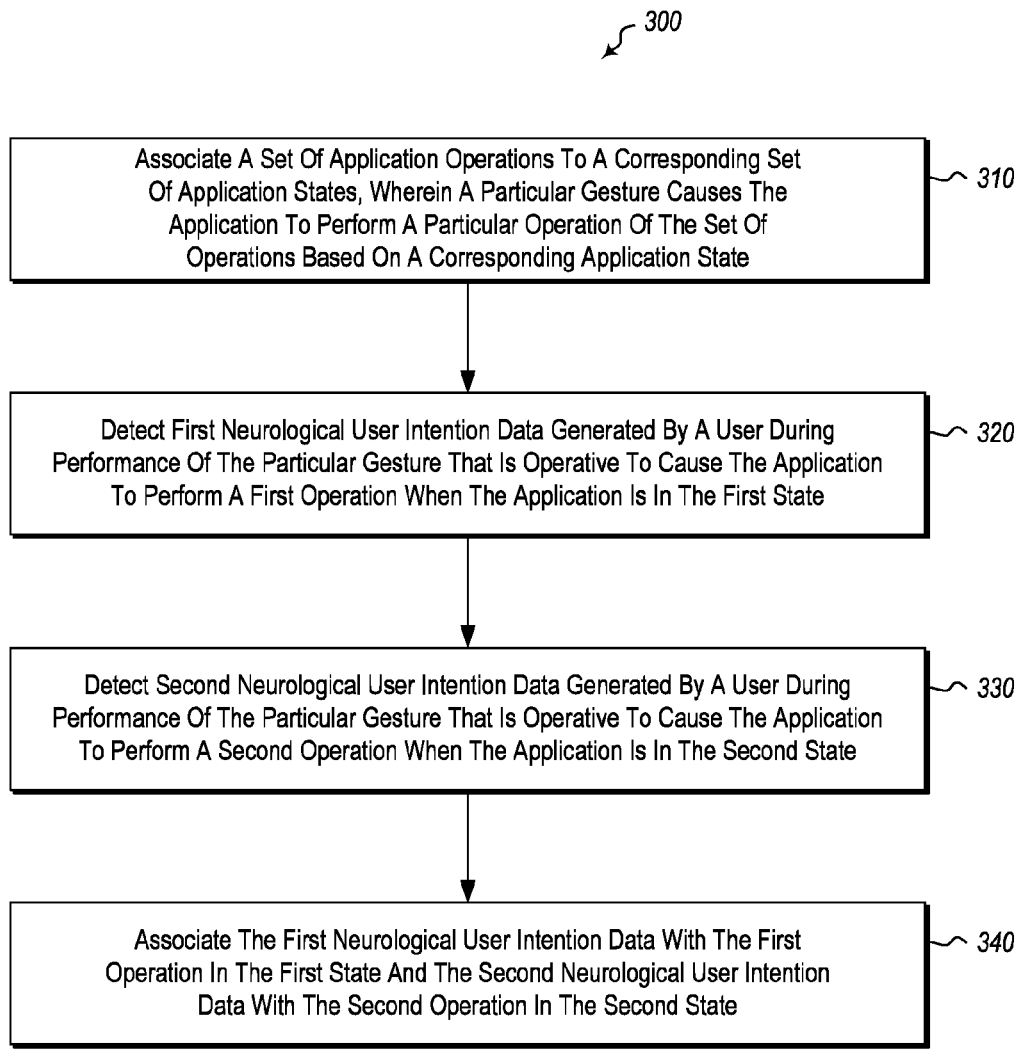
FIG. 3 illustrates a flowchart of an exemplary method for generating or managing a state machine.

FIG. 3 is a flowchart 300 of a computer-implemented method for creating and/or managing a state machine for at least one application. As shown, a computer system associates a set of application operations to a corresponding set of application states, wherein a particular gesture causes the application to perform a particular operation of the set of operations based on a corresponding application state (act 310). As described by the foregoing, and as shown by the illustrated examples described in detail below, a particular gesture can cause the execution of different operations in an application depending on the particular state of the application.

The computer system also detects first neurological user intention data generated by a user during performance of the particular gesture that is operative to cause the application to perform a first operation when the application is in the first state (act 320), and detects second neurological user intention data generated by a user during performance of the particular gesture that is operative to cause the application to perform a second operation when the application is in the second state (act 330). In an example of an augmented reality gaming application, the computer system monitors and detects user intention data while a user is performing an "air tap" gesture to select an object (e.g., a hologram object) when the gaming application is in a selection state, and monitors and detects user intention data while a user is performing the same air tap gesture to fire a virtual projectile when the application is in an action/play state.

The detection of the first neurological user intention data may be performed in conjunction with a training application or wizard and/or may include the background monitoring of user intention data while the application is put to normal use. Continuing the gaming application example, a training exercise may be utilized to collect sufficient neurological data associated with performance of the air tap gesture in the different contexts of the object selection operation and the virtual projectile operation so as to be able to build or update the state machine to distinguish the different neurological signatures of the user respectively associated with the different contexts. Additionally, or alternatively, a training program may run in the background while the user plays the game to gather neurological data to build and/or update the state machine.

The computer system subsequently associates the first neurological user intention data with the first operation in the first state and the second neurological user intention data with the second operation in the second state (act 340). For example, the neurological data associated with the air tap gesture performed with the intention of selecting an object is associated with the select object operation, and the neurological data associated with the air tap gesture performed with the intention of firing a projectile is associated with the fire projectile operation. Accordingly, the resulting generated state machine enables the user to perform the air tap gesture to perform the intended object selection or projectile firing operation without the need of manually switching between a selection state and a firing state, as the respectively associated neurological user intent data enables the application to automatically change to the appropriate state to enable execution of the intended operation.

Figure 4:
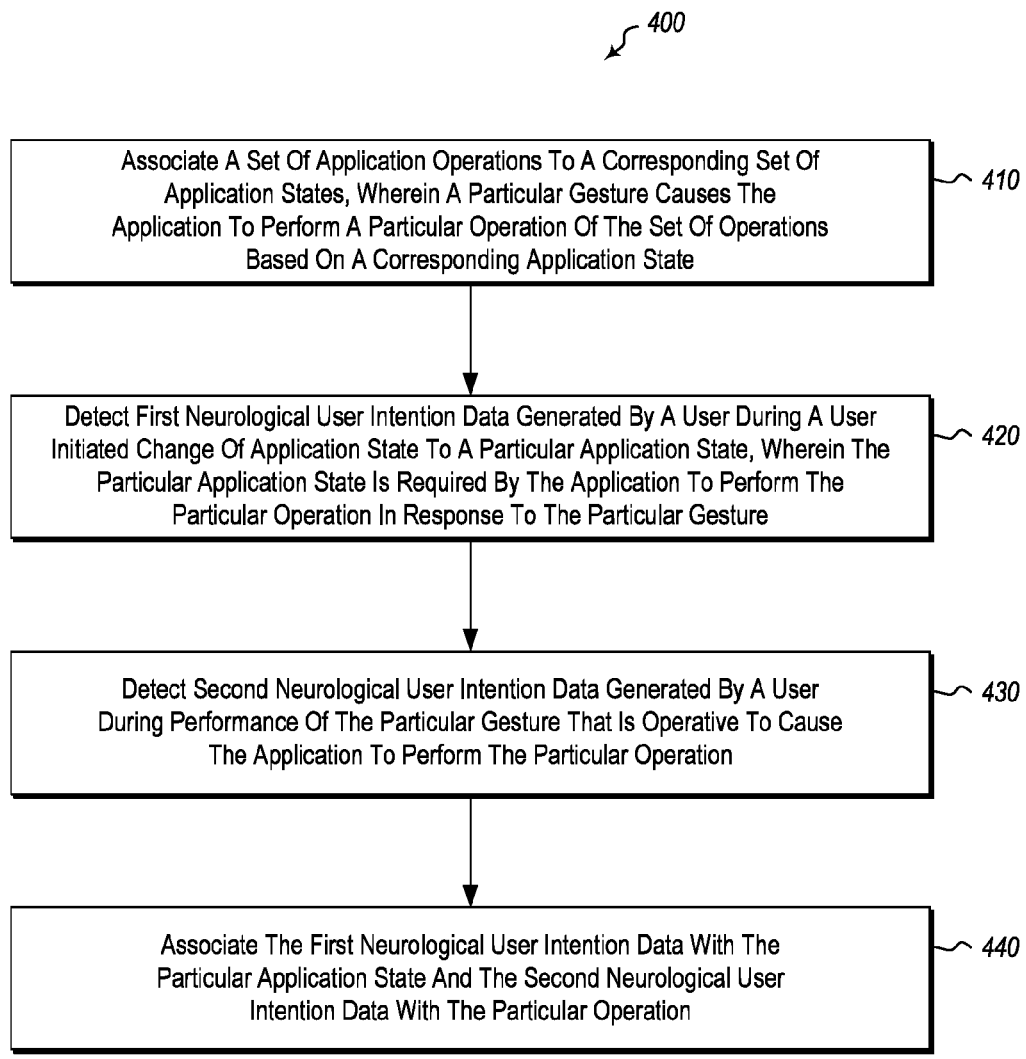
FIG. 4 illustrates a flowchart of an exemplary method for generating or managing a state machine.

FIG. 4 is a flowchart 400 of an alternative computer-implemented method for creating and/or managing a state machine for at least one application. As shown, a computer system associates a set of application operations to a corresponding set of application states, wherein a particular gesture causes the application to perform a particular operation of the set of operations based on a corresponding application state (act 410).

The computer system also detects first neurological user intention data generated by a user during a user initiated change of application state to a particular application state, wherein the particular application state is required by the application to perform the particular operation in response to the particular gesture (act 420), and detects second neurological user intention data generated by a user during performance of the particular gesture that is operative to cause the application to perform the particular operation (act 430). Using an alternative version of the augmented reality gaming application example, the computer system monitors and detects user intention data while a user manually changes the game from an object selection state to a projectile firing state, and monitors and detects user intention data after the user has changed the game state and is performing the air tap gesture to fire a virtual projectile.

The computer system subsequently associates the first neurological user intention data with the particular application state and the second neurological user intention data with the particular operation (act 440). For example, the neurological data associated with intentionally changing the game state to the projectile firing mode is associated with the projectile firing game state, and the neurological data associated with the air tap gesture performed with the intention of firing a projectile is associated with the fire projectile operation.

Accordingly, the resulting generated state machine enables the user to control state changing activity of the application, and corresponding context-based operations within the selected application state, using neurological user intent data. In some embodiments, for example, the generated user intent data operates to change the application to the desired state as a user thinks about and/or focuses on making the state change, thereby generating the actuating neurological intent data, as opposed to manually performing the gesture that causes the state change to occur.

The following examples illustrate operation and functionality of various exemplary embodiments for changing the state of an application using neurological user intent data. The scope of the concepts and features described herein and recited in the claims is not limited to these particular illustrated examples, nor the referenced types of applications. Other embodiments include different configurations and combinations of applications, application states, application operations, and/or associated neurological user intent data. Some additional non-limiting examples will now be provided to further clarify this point.

FIGS. 5A-5D illustrate operation of a state machine configured to change the state of a 3D modeling application using neurological user intent data, as an implicit user request that is needed to perform a desired function based on a particular gesture. FIGS. 5A-5D illustrate a user interface 500 showing a 3D object 510 within a canvas 520. The interface 500 also includes a pointer 550, a label 530 displaying the current application state and a dropdown menu 540 that enables manual changing of the application state. The 3D application is controllable through a mouse controller, a touch screen, a touchpad, and/or other input device, for example. In an alternative example, the 3D modeling application is operable in a virtual reality or augmented reality environment, where the application is controllable through user hand and finger gestures. Although a pointer 550 is illustrated in this example, it should be understood that other embodiments, particularly virtual reality or augmented reality applications and touch screen applications, the pointer 550 may be omitted and/or be controlled with a hand or other object.

Figure 5A:
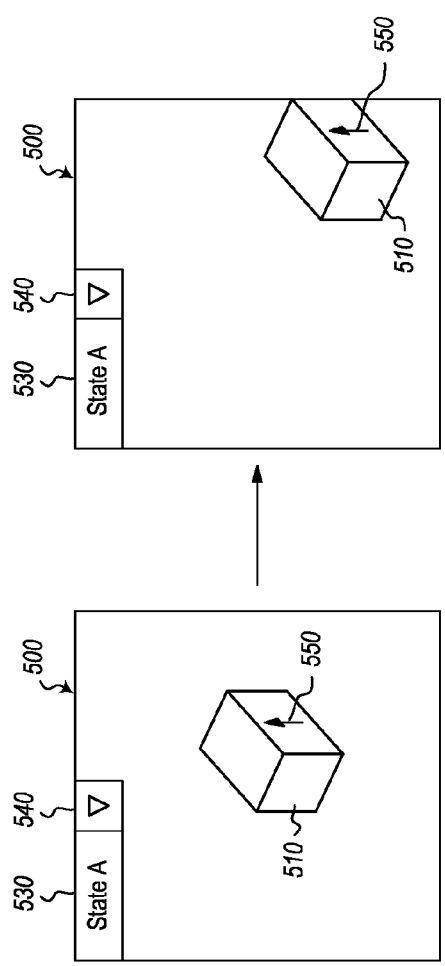
Figure 5B:
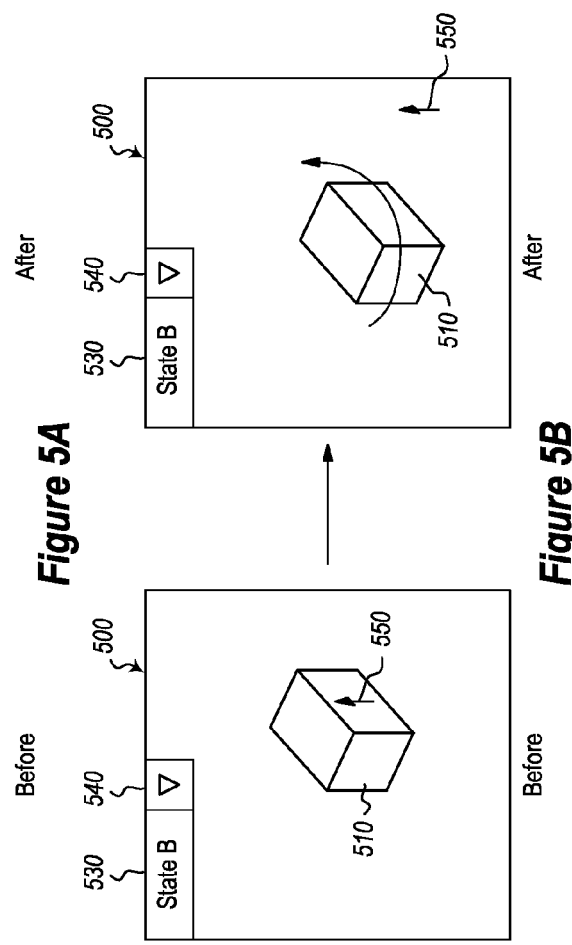

When the application is in "state A," as shown in FIG. 5A, a click and drag gesture or a tap and drag gesture executes a move operation that moves the 3D object 510 in the direction of the drag motion, as illustrated. When the application is in "state B," as shown in FIG. 5B, the same click and drag gesture executes a rotate operation that rotates the 3D object 510, as illustrated. When the application is in "state C," as shown in FIG. 5C, the same click and drag gesture executes an object extend operation that extends a selected face or point of the 3D object 510, as illustrated.

FIG. 5D illustrates operation of the state machine to automatically change the state of the 3D modeling application. As shown, a user 560 is fitted with a sensor 570 configured to sense and transmit neurological user intent data during interaction with the interface 500. Before a click and drag action is performed, the application is in state A, which associates the click and drag action with a move operation. The user, however, intends to perform an extend operation (as illustrated by thought bubble 580). As the user performs the click and drag action, the state machine receives neurological user intention data corresponding to the intended extend operation. In response, the state machine operates to change the application to state C to provide execution of the intended/desired extend operation, without requiring the user to manually or explicitly (through a menu or separate input) change the application state.

Figure 6:
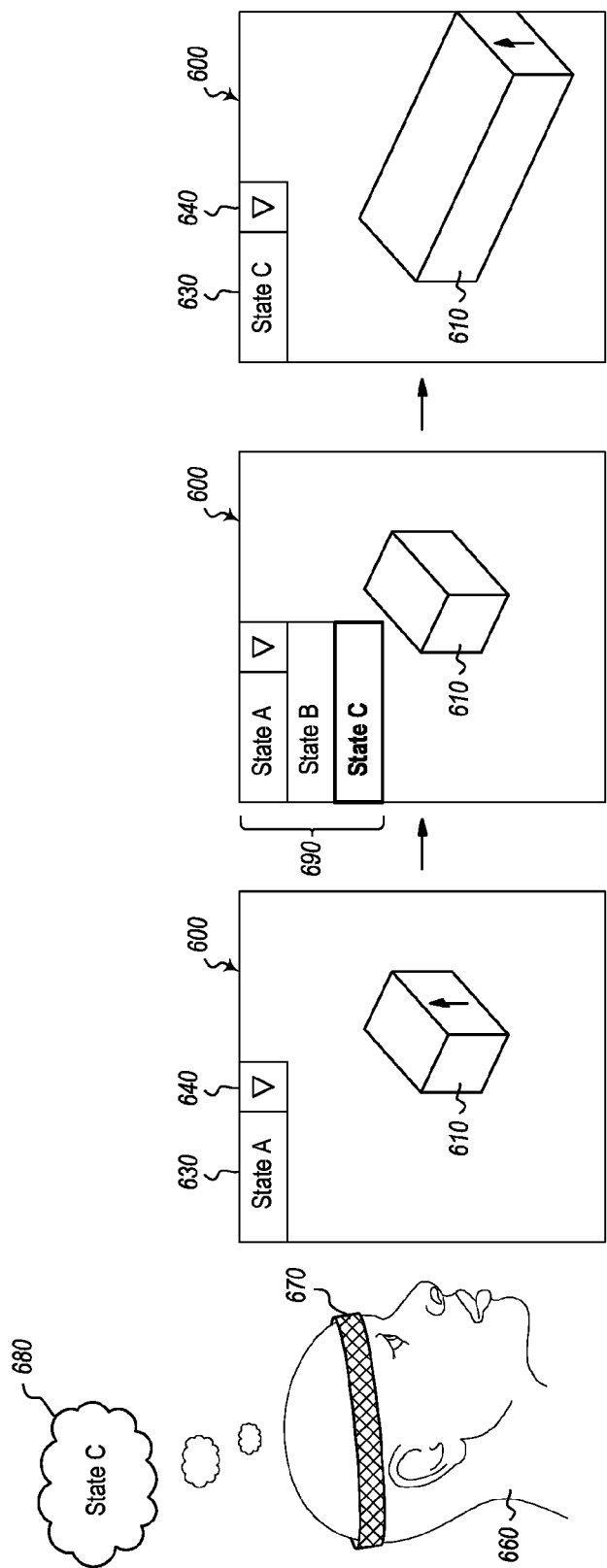
FIG. 6 illustrates operation of a state machine to expressly change the state of an exemplary application using neurological user intent data.

FIG. 6 illustrates an alternative mode of operation of a state machine to change the state of an application. In this example, the user does explicitly change application state, but does so with neurological user intent data rather than manual controls. Continuing with an exemplary 3D modeling application, a user 660 is fitted with a sensor 670 configured to sense and transmit neurological user intent data during interaction with user interface 600. The interface 600 includes a 3D object 610 within a canvas, a label 630 displaying the current application state, and a dropdown menu 640 enabling manual changing of the state upon user selection.

Initially, the application is in state A, which associates a click and drag action with a move operation. The user 660, however, intends to perform an extend operation, which requires the application to be in state C. Before performing the click and drag operation, the user 660 is aware that the application state needs to be changed to state C and intends to change the application to state C (as illustrated by thought bubble 680). As a result, the user generates neurological user intention data corresponding to a state change operation for changing the application to state C. In response, the state machine operates to change the application state to state C (using menu 690), after which the user 660 performs the click and drag gesture to execute the extend operation.

It will be appreciated, from the foregoing description, that various types of applications can be configured to utilize neurological user intent data to control state changes (explicitly) or automatically as an implicit part of performing a function based on a gesture and the user intent. Such embodiments can be used to provide increased user convenience and computational efficiencies over existing systems.

The disclosed embodiments may comprise or utilize a special-purpose or general-purpose computer system that includes computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, virtual or augmented reality headsets, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for changing a state of an application using neurological data, the method being implemented by a computing system that includes at least one processor and one or more hardware storage devices having stored computer-executable instructions that are executable by the at least one processor to cause the computing system to perform at least the following:

operating an application that includes at least a first application state, a second application state, and an application state dependent operation, wherein invoking the application state dependent operation in response to detecting a particular user input causes a first action within the application while the application is operating in the first application state but causes a second action within the application while the application is operating in the second application state;

while the application is operating in the first application state, detecting the particular user input invoking the application state dependent operation, the particular user input including neurological user intention data indicating that the user intends the particular input to cause the second action in accordance with the second application state;

based on detecting the particular user input, automatically changing the application from the first application state to the second application state; and causing the second action to be executed at the application.

2. The method of claim 1, further comprising performing the second operation in response to detecting the user input comprising the neurological user intention data.

3. The method of claim 1, wherein the application operates in a virtual reality or an augmented reality environment.

4. The method of claim 1, wherein the neurological user intention data of the detected user input includes electroencephalography readings that are generated from user performance of the particular gesture with an intention of causing the second operation through performance of the particular gesture.

5. The method of claim 1, further comprising:
detecting a subsequent user input while the application is operating in the second application state, after being changed from the first application state to the second application state, the detected subsequent user input comprising neurological user intention data that is associated with the particular gesture according to the first operation; and
changing the application from the second application state to the first application state in response to detecting the subsequent user input.

6. The method of claim 5, further comprising performing the first operation in response to detecting the subsequent user input.

7. The method of claim 5, wherein the neurological user intention data of the detected subsequent user input includes electroencephalography readings that are generated from user performance of the particular gesture with an intention of causing the first operation through performance of the particular gesture.

8. The method of claim 1, wherein the particular gesture is performed through one or more user movements without the accompaniment of additional input hardware.

9. The method of claim 1, wherein the neurological user intention data corresponding to the particular gesture is generated without physical performance of the particular gesture.

10. The method of claim 1, wherein the particular gesture is performed using one or more input hardware components.

11. The method of claim 1, wherein the application is a modeling application.

12. A computer-implemented method for creating and managing a state machine for at least one application, the state machine being configured to change a state of the at least one application based on neurological data received from a user, the method being implemented by a computing system that includes at least one processor and one or more hardware storage devices having stored thereon computer-executable instructions that are executable by the at least one processor to cause the computing system to perform at least the following:

associating a set of application state dependent operations to a corresponding set of application states within an application configured to include multiple application states, a particular user input causing the application to perform a particular application state dependent operation from the set of application state dependent operations based on a corresponding application state, wherein the application includes at least a first application state associated with a first application state dependent operation and a second application state associated with a second application state dependent operation;

as a result of detecting a first neurological user intention data generated by a user during performance of the particular user input, causing the application to perform a first application state dependent operation when the application is in the first application state;

as a result of detecting a second neurological user intention data generated by a user during performance of the particular user input, causing the application to perform a second application state dependent operation when the application is in the second application state; and as a result of detecting the second neurological user intention data generated by a user during performance of the particular user input while the application is operating in the first application state, automatically changing the application from the first application state to the second application state and causing the second application state operation to be executed at the application.

13. The method of claim 12, wherein the first and second neurological user intention data are generated by a single user, and wherein the state machine is thereby tailored to the single user.

14. The method of claim 12, wherein the first neurological user intention data with the first operation in the first state and the second neurological user intention data with the second operation in the second state using machine learning techniques.

15. The method of claim 12, wherein the first and second neurological user intention data include electroencephalography readings that are generated from user performance of the particular gesture with an intention of causing the first and second operation, respectively.

16. A computer-implemented method for creating and managing a state machine for at least one application, the state machine being configured to change a state of the at least one application based on neurological data received from a user, the method being implemented by a computing system that includes at least one processor and one or more hardware storage devices having stored thereon computer-executable instructions that are executable by the at least one processor to cause the computing system to perform at least the following:

operating an application that is configured to include at least a first application state, a second application state, and an application state dependent operation, wherein invoking the application state dependent operation in response to detecting a particular user input causes a first action within the application while the application is operating in the first application state but causes a second action within the application while the application is operating in the second application state;

while the application is operating in the first application state, detecting the particular user input invoking the application state dependent operation, the particular user input including neurological user intention data indicating that the user intends the particular input to cause the second action in accordance with the second application state;
based on detecting the particular user input, automatically changing the application from the first application state to the second application state; and
causing the second action to be executed at the application.

* * * * *